United States Patent [19]

Von Fulger

[11] Patent Number: 4,759,942

[45] Date of Patent: Jul. 26, 1988

[54] PROCESS FOR PRODUCING HIGH FIBER EXPANDED CEREALS

[75] Inventor: Charles Von Fulger, Katonah, N.Y.

[73] Assignee: General Foods Corporation, White Plains, N.Y.

[21] Appl. No.: 777,653

[22] Filed: Sep. 19, 1985

[51] Int. Cl.$^4$ ................................................. A23P 1/14
[52] U.S. Cl. ..................................... 426/621; 126/449; 126/463; 126/450
[58] Field of Search ............... 426/549, 560, 618, 619, 426/620, 452, 455, 456, 458, 459, 449, 450, 460, 461, 462, 463, 465, 466, 447, 448, 559, 621

[56] References Cited

U.S. PATENT DOCUMENTS

| | | | |
|---|---|---|---|
| 3,348,951 | 10/1967 | Evans | 426/21 |
| 3,573,061 | 3/1971 | Glabe et al. | 426/549 |
| 3,767,423 | 10/1973 | Tsanter et al. | 426/549 |
| 4,315,954 | 2/1982 | Kuipers et al. | 426/621 |
| 4,350,714 | 9/1982 | Duvall | 426/448 |
| 4,431,674 | 2/1984 | Fulger et al. | 426/18 |
| 4,435,430 | 3/1984 | Fulger et al. | 426/18 |
| 4,500,558 | 2/1985 | Fulger et al. | 426/463 |
| 4,620,981 | 11/1986 | Gordon et al. | 426/449 |

FOREIGN PATENT DOCUMENTS

| | | |
|---|---|---|
| 1122849 | 5/1982 | Canada . |
| 2345806 | 3/1975 | Fed. Rep. of Germany . |
| 1561190 | 2/1980 | United Kingdom . |

*Primary Examiner*—Raymond N. Jones
*Assistant Examiner*—Carolyn Paden
*Attorney, Agent, or Firm*—Thomas A. Marcoux; Thomas R. Savoie; Daniel J. Donovan

[57] ABSTRACT

The invention describes an improved process for producing a high fiber content direct expanded ready-to-eat breakfast cereal wherein the improvement lies in the incorporation of a bran material of a particle size of from 5 to 100 microns in the feedstock. The incorporation of bran material within this particle size will allow the production of a ready-to-eat breakfast cereal containing a specific density of from 0.15 to 0.40 grams per cc.

15 Claims, No Drawings

PROCESS FOR PRODUCING HIGH FIBER EXPANDED CEREALS

TECHNICAL FIELD

This invention relates to a ready-to-eat breakfast cereal product and more particularly to a direct expanded breakfast cereal product having a high fiber content.

BAGKGROUND ART

Bran, the outer layer of grains, is a low-cost food material which has found its greatest utility as a breakfast cereal fiber ingredient. Recently there has developed increasing interest among nutritionists and consumers in high-fiber food products and particularly high-fiber, ready-to-eat cereals. At the present time, grain bran is the principle fortifying ingredient relied upon to provide high fiber content, thus, the presence of bran in cereals is highly desirable as an excellent source of natural fibers. Recent medical research indicates that a diet rich in fiber is advantageous for the maintenance and satisfactory functioning of the gastrointestinal tract. The presence of a sufficient amount of fiber in the diet has been advocated as playing a preventive role in the development of colon cancer and diverticulosis; in removing bile acids from the intestines with consequent lowering of cholesterol levels of which substance bile acids are derived of, elimination of microbial toxins from the colon and increasing fecal moisture level with consequent improvement in elimination.

The conventional breakfast cereal processing technology generally uses bran with a particle size between 20 and 100 U.S. standard screen size (approximately 150 to 840 microns). When bran particles within this size range are added to food products, the food product acquires an undesirable gritty, chewy mouthfeel and becomes hard to swallow due to the tough and abrasive fiber particles. The bran also interferes with certain processes, and with the development of a light, foamy texture in puffed cereal food products. In most food applications, long, large strands of fiber alter the texture contributed by the other food components and interfere with the processing of the food.

U.S. patent application Ser. No. 457,994 also in the name of Fulger, filed on Jan. 14, 1983 now abandoned, teaches an improved functional bran material of an average particle size of from 5 to 100 microns. The bran particles within this particle size range are taught to possess an increased functionality and improved texture forming property. The patentee suggests the incorporation of the micromilled bran into a number of food products including an expanded cereal product.

West German published application No. Offenlegungsschrift Dt 23 45 806 having a filing date of Sept. 11, 1973 and a disclosure date of Mar. 20, 1975 teaches the use of a bran with a granule size between 0 and 50 microns, preferably between 0 and 20 microns as a filler for low-calorie foods. It is stated there that the bran within the granule size specified, no longer has the unpleasant gritty texture characteristic of bran, but instead has a distinctly pleasant nutty taste.

Because of the desirability of bran nutritionally in the diet, those skilled in the food art have attempted to incorporate high levels into ready-to-eat breakfast cereals. Representative of these attempts are the following two patents, U.S. Pat. No. 4,350,714 issued to Duvall entitled "Corn Bran Expanded Cereal" and Canadian Pat. No. 1,122,849 issued to Hart et al. entitled "Process for Cooking and Extruding Food Mixture". (This Canadian patent is identical in its disclosure to UK Patent Specification No. 1 561 190 which was filed Dec. 20, 1977.) The Duvall patent teaches the production of a ready-to-eat expanded cereal product made in a cooker extruder which contains corn bran flour in an amount sufficient to provide at least a 1.5 percent fiber in the product, the corn bran flour having been ground to a fineness whereby 100 percent passes through a 40 mesh U.S. sieve (420 microns). The Hart et al. Canadian patent teaches a process for extrusion cooking a food mixture containing 40 to 90 percent by weight cereal bran, a binding agent and a total pre-determined water content of not more than 20 percent by weight comprising the steps of cooking the food mixture at a temperature of from 100° C. to 270° C. and a pressure of from 50 to 150 atmospheres, extruding through a die to create expansion of the mixture after extrusion and thereafter cutting the mixture as it issues from the die to produce an expanded product with a density of not more than 0.8 grams per milliliter, (about 50 lbs/ft$^3$).

While the food art has been successful in producing certain bran containing ready-to-eat cereals, there remains a need to produce a ready-to-eat cereal with a high bran content that has a high degree of expansion to give a puffed cereal a light and foamy texture comparable to those produced from a cereal dough which is made of predominantly starch based material such as the endosperm fraction of grains.

It is an object of the present invention to produce a puffed, high bran containing ready-to-eat cereal product of acceptable texture and absence of gritty mouthfeel.

SUMMARY OF THE INVENTION

The present invention involves an improvement process for producing a high-fiber content, ready-to-eat breakfast cereal. This type of process involves the steps of admixing water with cereal dough ingredients including an amount of micromilled bran sufficient to produce a crude fiber content of from about 3 to 9 percent by weight and preferably between 4–7% crude fiber by weight in the breakfast cereal product corresponding to an approximate dietary fiber content of about 15–45%. After the various cereal dough ingredients are mixed with water the material is extruded under time and temperature conditions sufficient to produce expansion of the cereal dough upon exiting a cooker extruder. The improvement of the present invention involves incorporating a bran material of the particle size of from about 5 to 100 microns and preferably from 40–80 microns in the cereal dough ingredients which upon expansion after exiting the cooker extruder will produce a ready-to-eat cereal of a specific density of from about 0.15 to about 0.40 grams per cc, (about 9.4 to 25.0 lbs/ft$^3$), and preferably from about 0.18 grams to about 0.25 grams per cc, (about 10.6 to 15.6 lbs/ft$^3$) as determined analytically (by the procedure outlined in Example 4). Specific density in this application shall be defined as the weight of an extruded cereal unit, where the cereal particle volume excludes holes, cavities and crevices, due to design or manufacturing imperfection, but not the internal or surface pores which are the result of steam expansion of the extruded, plastic dough material. The lower limit of the bran particle size is governed by commerical considerations and concern over persorption, the upper limit by the observation that particles of approximately 120 microns and larger exhibit deleterious organoleptic effects. If a bran material of commercially available particle size (approximately 150 to 840 microns) is substituted for the bran particle size taught by the present invention either one of two possibilities may occur: (1) it will be impossible to extrude such a mixture into an acceptable product or, (2) the extruded product containing the higher size bran material will not fall within the density range claimed by applicant.

BEST MODE FOR CARRYING OUT THE INVENTION

The present invention describes an improvement for producing a high-fiber content ready-to-eat breakfast cereal wherein bran of a particle size of from about 5 to about 100 microns and preferably from about 40 to about 80 microns is substituted for commercially available bran which characteristically will have a particle size between 20 and 100 U.S. standard screen size (approximately 150 to 840 microns average particle size). This mere substitution and a change in processing conditions, will permit the production of a highly expanded high-fiber content ready-to-eat breakfast cereal which will fall into the range of density from about 0.15 to about 0.40 grams per cc, (about 9.4 to 25.0 lbs/ft$^3$) and optimally from about 0.17 gm/cc to about 0.25 gm/cc (about 10.6 to 15.6 lbs/ft$^3$).

The bran product falling within the specifications of the present invention is prepared by feeding commercially available bran into a micromilling apparatus preferably an impact mill and more preferably an impact mill in combination with an air classifier. (Micromilling, as referred to in this application, shall refer to the production of an average bran particle size under 100 microns in average size, a particle size unattainable by most commercial mills.) An impact mill manufactured by Vortec Products Company (Long Beach, Calif.), will grind material to a selected size range varying upward from particle size of less than 5 microns. Material that is poured into the feed tunnel in this unit will proceed to the center of rotor where it is propelled outward through the rotor channels. The air flow produced by the rotor and the centrifugal force, carries the material outward. In travelling outward the material is accellerated to reach maximum velocity at the rotor rim. Here the material leaves the rotor and is thrust against an impact block where the material is shattered. The shattered material is carried by the air flow to either a collecting cyclone and connecting container or preferably to an air classifier which functions to return oversized particles to the mill and very fine particles to a dust collector. The air flow functions both to carry the material out of the unit and to cool the equipment and the product which is being milled.

The bran material which is incorporated into the cereal dough for the improvement of the present invention will be of a particle size of from 5 to 100 microns, preferably from 40 to 80 microns. The latter number is preferred because of persorption phenomena in that small, micron size fiber particles can conceivably be absorbed into the body unchanged. Additionally, the preferred level finds greater commercial applicability with this specified equipment because of milling efficiencies at that size production level.

The dietary fiber levels of the present invention will vary from a level of approximately 15 percent to 45 percent dietary fiber, and preferably 20 percent to 35 percent dietary fiber. The neutral detergent residue (NDR) fiber analysis represents dietary fiber, that is, not digestible by humans, consisting mainly of cellulose, hemicelluloses, lignin and some pectins. Other components of dietary fiber may include biologically unavailable gums, mucilages, modified polysaccharides as well as some fiber bound protein. Certain other substances intimately associated with the plant cell wall such as small amounts of non-lignite phenolics, chitin, glucan, phytic acid, etc. as well as some minerals are included in some definitions of dietary fiber. The polysaccharides associated with dietary fiber are not digested by human digestive enzymes but are partially metabolized in man by the colonic microflora. Those skilled in the art will appreciate that the term dietary fiber is an indefinite one which has several meanings depending upon the method of assay among other variables. To remove this uncertainty the definition of NDR or dietary fiber in this application will be as defined by the method of Goering and VanSoest (*Agricultural Handbook* No. 379, A.R.S. USDA Washington, DC 1970) as modified and discussed by Robertson (Chapter 1). The detergent system of fiber analysis in (*Topics in Dietary Fiber Research* edited by G. A. Spiller and R. J. Amen, Plenum Press New York 1978).

The high fiber content ready-to-eat breakfast cereal produced according to this invention will have a crude fiber content of approximately 3 percent to 9 percent and preferably from 4 percent to 7 percent.

Crude fiber is defined as loss on ignition of dried residue remaining after digestion of sample with 1.25 percent sulfuric acid and 1.25 percent sodium hydroxide under specific conditions. Typical conditions and methods are described in the *Official Method of Analysis of the Association of Offical Analytical Chemists*.

After the cereal dough ingredients containing the high level of fiber previously discussed are mixed with water to form a feedstock, the feedstock is extruded in a cooker extruder or alternately water is injected into the extruder. The cooker extruder may be a single screw extruder such as those produced by the Wenger Manufacturing Corportion, Sabetha, Kans., or the cooker extruder maybe of the twin screw type such as the twin screw food extruders manufactured by Baker Perkins, Inc. Raleigh, N.C., or those manufactured by Werner & Pfleiderer Machinenfabrik Stuttgart, West Germany.

According to the present invention, the cereal dough ingredients are combined with water to form the feedstock material which is then extruded to form the ready-to-eat breakfast cereal. Preferably the cereal dough ingredients will comprise 90 percent or more of a bran material, more preferably 95 percent or greater and most preferably 100 percent bran material. As is readily apparent to those skilled in the art, the term bran is used in the trade to describe a mixture of several botanical tissues: pericarp (fruit coat), seed coat (the pericarp and seed coat are highly adherent at maturity), nucellus, and the outer most portion of the endosperm, the aleurone and some subaleurone layer which contains starch. Because the bran material will contain the outer most portion of the endosperm most commercially available bran products will contain from about 20 to about 60 percent starch. Therefore, the feedstock materials of the present invention will contain a level of starch of approximately from about 20 to about 60 percent by dry weight basis of the cereal dough ingredients in the feedstock, preferably the starch will be of the type naturally present within the bran material and no additional starch will be admixed therewith.

In determining commercially available brans, the term heat wheat bran refers to the overs (coarse fraction) after the sifting of the grain milled through the first mill rolls. Light wheat bran means the overs after the sifting of the grain milled through the last mill rolls, where all the commercially produced flour has been removed.

Direct-expanded, ready-to-eat breakfast cereals with a specific density with the aforementioned range of 0.15 to 0.40 g. per cc. (about 9.4 to 25 lbs/ft$^3$) have been prepared from bran feedstock materials made up of 100% heavy wheat bran, 50% heavy wheat bran and 50% light wheat bran and 70% heavy wheat bran and 30% light wheat bran. Those knowledgeable in the art will realize that similar fiber blends can be achieved by mixing light wheat bran with flour.

To prepare the feedstock, the cereal dough ingredients are admixed with water to a finished feedstock moisture level of from approximately 16 to 30 percent moisture, preferably from 20 to 25 percent. This amount of moisture represents an increase over typical conditions used to direct expand flour based doughs on cooker extruders where typically the extruder dough moisture content runs from about 14% to about 18%. This is due to the increased water holding of the micromilled bran. Generally, lower moisture contents in the feedstock result in increased expansion with typical high temperatured cooking extrusion of starch based materials. However, this phenomena appears to be reversed in the aforementioned range with the extrusion of micromilled bran.

Some extrusion parameters which are utilized to extrude the expanded puffed cereal of the present invention which would include such parameters as screw speeds, temperatures, pressures, specific energy, residence time and throughput rates are in the ranges similar to those practiced in the art of high temperature cooking and direct expanding, extrusion processes.

However, several process parameters were found to be different from the state of the art. The main differences in extruding the micromilled bran were higher feedstock moisture content, different screw configurations in conjunction with water injection sites and a different die plate. Higher moisture (16–30%) is required to process the bran than the conventional feedstock (14–18% moisture) as previously discussed. Longer feeding screws and delayed downstream water injection into extruder are essential to overcome the impared flow and feeding characteristics of the micromilled bran feedstock to avoid surging and plugging of the extruder. It is preferred to have more mixing screws after water injection into the extruder to ensure the complete, homogenous water distribution or alternately premixing the feedstock with water prior to feeding it into the extruder. A thinner die plate is necessary to avoid setting up the bran dough between the screws and the die orifice. This is due to diminished plastic flow of the cooked bran dough.

Typically, the feedstock material will be extruded at a maximum temperature of from 250° to 350° F. at a pressure within the range of 350 to 1000 psi (the pressure is affected by the level of moisture in the feedstock), and an equilibrated, process residence time within the extruder varying from approximately 15 to 45 seconds. The shear conditions utilized in the cooker extruder will fall within the high shear range as will be understood by those skilled in the art.

The expanded cereal product of the present invention will have a high degree of expansion such that the product will have a specific density of from 0.15 to 0.40 grams per cc., preferably from 0.17 to 0.25 grams per cc. This level of expansion corresponds very favorably to the degree of expansion which would be typical of an expanded cereal derived from a feedstock of only starchy endosperm materials.

The bran material which is incorporated into the feedstock may be either wheat, corn, barley, rye or oat. Additionally, combinations of different bran materials maybe utilized. The preferred bran materials are corn or wheat.

This invention is further illustrated but not limited by the following examples.

EXAMPLE 1

100% micromilled Heavy Wheat Bran, 40 micron average size, was direct expanded on a Wenger X20 (Sabetha, Kans.) extruder.

The extruder was equipped with the following water cooled heads, screws and steam locks:

standard inlet head (68714-1), single flight conveying screw (68327-1); low restriction steam lock (68364-1);

Second and Third Heads: spiral ribbed moderate cook (68372-1), single flight conveying screws (68327-1), and low restriction steam locks (68364-1);

Fourth and Fifth Heads: straight ribbed, high cook (68318-1), double flight moderate compression screws (68326-1), and high restriction steam locks (68324-1);

Sixth Head: double spiral cone, moderate cook (68350-1), triple flight high compression screw (68387-1).

The extruder was operated as 420 rpm speed, drawing 22 to 24 amps. The feeder was operated at 22 rpm. Steam was not applied to the mixing cylinder, but water was added at 5.3 lbs/hour. Water was not injected into the extruder barrels. The feedstock as received assayed 12% moisture content. The moisture content of the extruded feedstock was approximately 16%.

The mixing cylinder temperature was set at 180° F. and the feeder setting (manufacturer's caliber) was at "3". Thermocouple temperature at the Sixth Head was controlled at 225° F. by steam heating or water cooling. Product pressure at the last head was about 900 to 950 psi. Approximate food temperature in the die plate was 325° F.

The die assembly consisted of: ¾ inch thick with 8 each 0.156 inch φ feeder hole (66918-39) die spacer; an ⅛ inch single hole (66347-11) backup plate, a single hole (68322-29) die plate with a 0.312 inch φ (31350-699) die insert, which was equipped with a 0.125 inch φ (31350-775) die pin. The product was finish dried in a tunnel dryer at approximately 240° F. temperature, with an approximate dryer retention time of 13 minutes. The process rate (weighed at extruder die orifice) was approximately 115 lb/hour. Equipment data is given in pounds and inches as is the standard for this manufacturing company.

The direct expanded cereal had a product particle density of 0.19 per cc. (about 11.9 lbs/ft$^3$) and satisfactory expansion and smooth texture without any gritty mouthfeel. The approximate fiber content of the expanded cereal was about 3% crude fiber corresponding to about 15% dietary fiber.

EXAMPLE 2

A cereal formula containing 50:50 mixture of micromilled heavy and light wheat brans, average particle size 60 micron, was mixed thoroughly and fed into a Baker Perkins, Inc., (Raleigh, N.C.), twin screw extruder, Model MPF:50D. The extruder was operated as follows: dry feed rate 170 lbs/hr; water feed rate 36.4 lbs/hr; screw rpm 500; head pressure 800 psi; extruder barrel temperatures were maintained by heating as follows: #1 60° F., #2 125° F., #3 200° F., #4 300° F., #5 325° F. The screw configuration (with all kneading paddles ¼" wide) consisted of ¼" spacers, 11" long, double lead, 2" pitch feed screws, 3°–30° forwarding paddles, 2" long, 1" pitch, double lead, feed screws, 4°–45° forwarding paddles, 3°–90° kneading paddles, 1" long, ½" pitch single lead screws, 7°–45° forwarding paddles, orifice plugs (⅜" thick discs), 1" long, ½" pitch, single lead screws, 4°–45° forwarding paddles, 3°–90° kneading paddles, 2" long, ½" pitch single lead screws. The total screw length was 29.25 inches. The die consisted of 2 (30°) slope loop dies in shallow die plate with a total open area of 0.106 inches$^2$, and a standard 4 blade cutter.

A fully puffed, high fiber cereal product with a smooth and snappy texture and pleasant eating characteristic was obtained. The product particle density was 0.19 g. per cc.

EXAMPLE 3

A cereal formula containing 70:30 mixture of micromilled heavy and light wheat bran, average particle size 60 micron, was mixed thoroughly and fed into a Baker Perkins, Inc., (Raleigh, N.C.), Model MPF:50D, twin screw extruder. The extruder was operated as follows: dry feed rate 168 lbs/hr; water feed rate 25.7 lbs/hr; with feedstock moisture at 7%; screw rpm 400; head pressure 630 psi; extruder barrel temperatures were maintained by electric heating and water cooling as follows: #1 82° F., #2 128° F., #3 198° F., #4 300° F., #5 325° F. The screw configuration (with all kneading paddles ¼" wide) consisted of ¼" spacers, 11" long, double lead, 2" pitch feed screws, 3°–30° forwarding paddles, 2" long, 1" pitch, double lead, feed screws, 4°–45° forwarding paddles, 3°–90° kneading paddles, 1" long, ½" pitch, single lead screws, 7°–45° forwarding paddles, orifice plugs (⅜" thick discs), 1" long, ½" pitch, single lead screws, 4°–45° forwarding paddles, 3°–90° kneading paddles, 2" long, ½" pitch, single lead screws. The total screw length was 29.25 inches. The die consisted of 2, each 6 slits inserts, in shallow die plate with a total open area of 0.096 in$^2$ and a standard 2 blade cutter. A fully puffed, high fiber cereal product with a smooth and snappy texture and pleasant eating characteristic was obtained. The density of the product was 0.17 gm/cc (about 10.7 lbs/ft$^3$).

EXAMPLE 4

Several categories of commercial cereals and cereals produced in accordance with this invention were analyzed for shape and size independent particle density, by an analytical procedure based on techniques accepted for bakery products. The procedure involves the filling in of the void spaces between the cereal particles by a measured amount of fine glass beads in a mechanical tapping apparatus and the particle density calculated by difference. The apparatus used was a Probat Emmerich volumetric analyzer. The glass beads size was from 0.17 to 0.18 mm supplied by Sargent Welch, Catalog #S-61760-30-B. The apparatus is obtainable from John Sheffman Inc., 921 Bergen Avenue, Jersey City, N.J.

It was determined that typical, high starch endosperm based puffed cereals have average particle densities ranging between about 0.17 and 0.3 g per cc., i.e., 0.17 (Trix ®), 0.22 (Cheerios ®), 0.25 (Alpha Bits ®), 0.27 (Fruit Loops ®)

Typical bran cereals have an average particle density like 0.80 (All Bran ® and Bran Buds ®), 0.82 (Cracklin Oat Bran ®). In one case where corn bran was extruded into pillows (hollow bubbles), the density was about 0.55 g per cc, when the pillows were cracked open to disregard the internal cavity volume. (This corn bran cereal was manufactured by Quaker Oats utilizing the teachings set forth in the Duvall patent, U.S. Pat. No. 4,350,714 entitled Corn Bran Expanded Cereal.)

By the technique described in this invention direct expanded cereals produced by various cooker extruders using micromilled grain brans had particle densities like 0.19 g per cc (100% micromilled, 40 micron average size, heavy wheat bran, prepared on Wenger, Sabetha, KS, X20 single screw cooker extruder), 0.20 g per cc (100%, micromilled 80 micron average size, heavy wheat bran extruded on Baker Perkins, Raleigh, NC, twin screw cooker extruder), 0.2 g per cc (70% heavy wheat bran and 30% light wheat bran, micromilled to an average particle size of 80 micron also extruded on a Baker Perkins extruder) and 0.25 g per cc (50% heavy wheat bran and 50% light wheat bran, both micromilled to average particle size of 80 micron also extruded on a Baker Perkins extruder).

The above densities can be varied somewhat by the techniques of extrusion and the aformentioned densities were obtained to achieve optimum organoleptic perception rather than the lightest possible particle density.

The first two examples of the experimental, micromilled bran derived puffed cereals signify, that the particle size had little effect on the efficacy of the invention as long as the average size was less than 100 micron (the average particle size was established by utilizing a laser analyzer technique, using a Model 2600 D particle analyzer, Malvern Instruments Ltd., Malvern, England). The material had a narrow particle size spread due to the milling technique where the mill is run tandem with an air classifier, eliminating sub size particles and returning oversize particles to the mill for remilling).

When industrially available bran materials were attempted to be extruded into a direct expanded cereal, the densities were in the range of the aforementioned commerical bran cereals or in some cases cohesive products were not possible to obtain, i.e., extruding a 50:50 mixture of commercial light and heavy wheat brans on the aforementioned Baker Perkins twin screw extruder resulted in a 0.56 grams/cc product (approximately 34.7 lbs/ft$^3$), as the best density obtainable.

I claim:

1. In a process for producing a high fiber content, ready-to-eat breakfast cereal of the type produced by admixing water with cereal dough ingredients, including an amount of bran sufficient to produce a fiber content within the range of 3 to 9 percent crude fiber by weight in the ready-to-eat breakfast cereal product and extruding the mixture under time and temperature conditions sufficient to produce expansion of the cereal dough upon exiting a cooker-extruder, the improvement comprising incorporating a bran material in the cereal dough ingredients, said bran material having an average particle size of from 5 to 100 microns which upon expansion after exiting the cooker extruder will produce a ready-to-eat cereal of a specific density of from 0.15 to 0.40 grams per cc.

2. The process according to claim 1 wherein the ready-to-eat breakfast cereal is of a density of from 0.17 to 0.25 grams per cc.

3. The process according to claim 1 wherein the bran material is of an average particle size of from 40 to 80 microns.

4. The process according to claim 1 wherein the ready-to-eat breakfast cereal contains a level of crude fiber of from 4 to 7 percent.

5. The process according to claim 1 wherein the ready-to-eat breakfast cereal contains a level of dietary fiber of from 15 to 45 percent.

6. The process according to claim 1 wherein the ready-to-eat breakfast cereal contains a level of dietary fiber of from 20 to 35 percent.

7. The process according to claim 1 wherein the bran material is selected from the group consisting of wheat, corn, barley, rye, oat, and combinations thereof.

8. The process according to claim 1 wherein the bran material is corn bran.

9. The process according to claim 1 wherein the bran material is wheat bran.

10. The process according to claim 1 wherein the cereal dough ingredients comprise greater than 90 percent bran.

11. The process according to claim 10 wherein the cereal dough ingredients comprise greater than 95 percent bran.

12. The process according to claim 11 wherein the cereal dough ingredients comprise 100 percent bran.

13. The process according to claim 12 wherein the cereal dough ingredients comprise 100% heavy wheat bran.

14. The process according to claim 12 wherein the cereal dough ingredients comprise approximately 50% heavy wheat bran and approximately 50% light wheat bran.

15. The process according to claim 12 wherein the cereal dough ingredients comprise approximately 70% heavy wheat bran and 30% light wheat bran.

* * * * *